United States Patent [19]
Cunningham

[11] Patent Number: 5,927,745
[45] Date of Patent: Jul. 27, 1999

[54] FOLDABLE UTILITY CART

[76] Inventor: John Cunningham, 1761 Mustang Ct., Wheaton, Ill. 60187

[21] Appl. No.: 08/818,609

[22] Filed: Mar. 14, 1997

[51] Int. Cl.$^6$ .................................................. B62B 1/12

[52] U.S. Cl. ........................... 280/652; 108/118; 108/119; 211/201; 211/132.1

[58] Field of Search .............................. 280/47.17, 47.18, 280/47.19, 47.24, 47.34, 47.35, 79.3, 638, 639, 651, 652, 655, 659, 35; 108/117, 118, 119; 248/128, 129, 688; 211/201, 202, 195, 126.6, 132.1, 149

[56] References Cited

U.S. PATENT DOCUMENTS

| | | |
|---|---|---|
| 1,970,727 | 8/1934 | Bates . |
| 3,110,476 | 11/1963 | Farris .................................. 108/119 X |
| 3,990,653 | 11/1976 | Marcell ............................ 280/47.17 X |
| 4,138,139 | 2/1979 | Alfonson ................................. 280/652 |
| 4,253,677 | 3/1981 | Wissler . |
| 4,266,791 | 5/1981 | Myers . |
| 4,611,823 | 9/1986 | Haas ..................................... 280/651 X |
| 4,624,467 | 11/1986 | Burns . |
| 4,635,956 | 1/1987 | Morrissette . |
| 4,669,743 | 6/1987 | Tipke . |
| 4,824,137 | 4/1989 | Bolden . |
| 4,826,202 | 5/1989 | Morrissette . |
| 4,957,306 | 9/1990 | Greenberg . |
| 5,002,293 | 3/1991 | Gottselig .............................. 280/651 X |
| 5,080,387 | 1/1992 | Ryals . |
| 5,154,441 | 10/1992 | White et al. ......................... 280/652 X |
| 5,318,315 | 6/1994 | White . |
| 5,664,718 | 9/1997 | Vine ................................... 224/926 X |

*Primary Examiner*—Richard M. Camby
*Assistant Examiner*—William R. Zimmerli
*Attorney, Agent, or Firm*—McHale & Slavin, P.A.

[57] ABSTRACT

A folding utility cart for a providing a movable work platform which may be raised and lowered without the use of tools. The cart employs an upper support member that is spaced apart from a lower support member by a pair of cross braces. A biasing spring helps raise the upper support member into an elevated position, and a releasable lock secures the upper support member into the elevated position. A lock release disengages the upper support member from the elevated position. The cart also has a handle, support feet, and wheels, allowing use in a conventional manner.

5 Claims, 3 Drawing Sheets

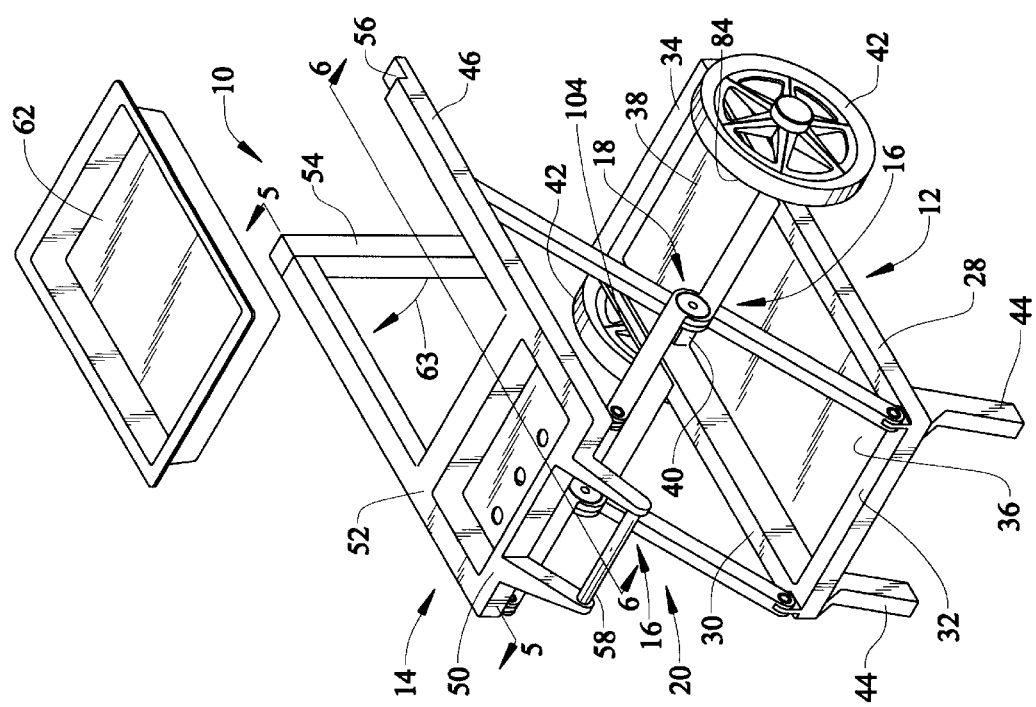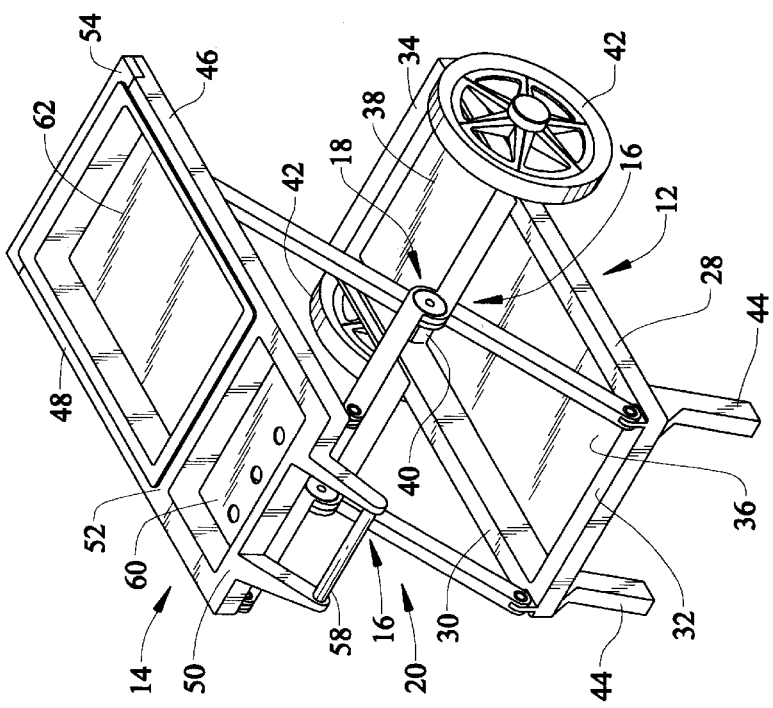

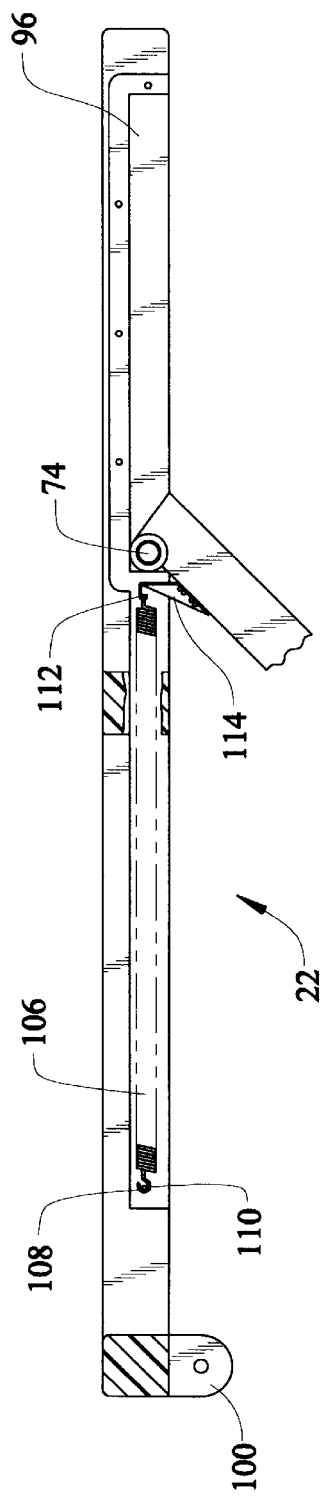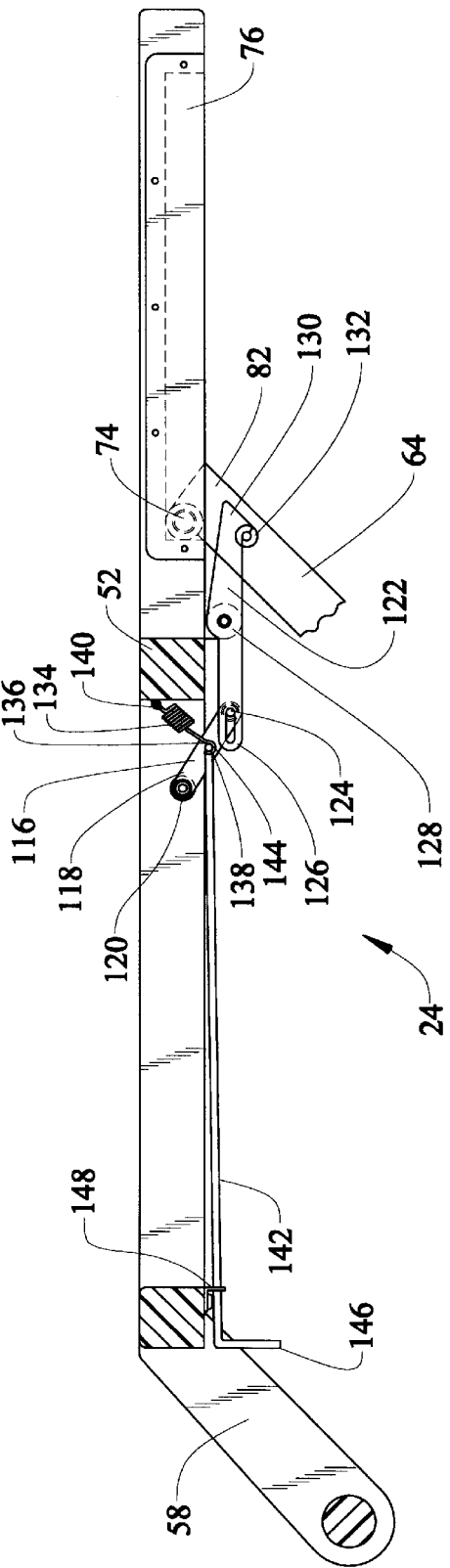

FOLDABLE UTILITY CART

FIELD OF THE INVENTION

This invention relates to a foldable wheeled utility cart with a lower shelf and a connected upper shelf which can be raised from a relatively-flat storage position and locked into an elevated working position via a trigger-operated locking mechanism proximate to the cart handle.

BACKGROUND OF THE INVENTION

Work endeavors frequently involve moving a variety of objects or tools from one location to another. Such objects can often be too large, quantitative, and/or heavy for one or more persons to move without assistance of a cart or dolly. As a result, a variety of such carts have been developed for loading and moving articles. Such carts, however, require a large storage space due to their required size for hauling large loads. Moreover, the size of such carts often precludes conveniently loading them into a transport vehicle for use at distant work sites. In order to provide a more transportable and storable device, the prior art provides a variety of folding and collapsible carts.

U.S. Pat. No. 1,970,727 discloses a leaf incinerator and dump cart which can be knocked down and disassembled with all of its parts laid in a compact arrangement for a crating operation. Similarly, U.S. Pat. No. 5,318,315 discloses a portable wheel cart which must also be disassembled in order to effectuate storage. U.S. Pat. No. 4,824,137 discloses a cart with a collapsible inner basket comprised of removable side panels mounted onto a wheeled frame and a removable top frame for securing the panels in place. Complete disassembly of these carts, however, is required for storage. Such disassembly is inconvenient and time consuming as the cart must be completely reassembled at the distant location.

U.S. Pat. No. 4,253,677 discloses a folding utility cart with side panels which can be removed and slidably attached to the bottom floor panel of the cart for flat storage. This cart also requires partial disassembly of the component parts in order to effectuate folding of the cart.

Still other disclosures provide a collapsible bin or utility area. For instance, U.S. Pat. Nos. 4,266,791 and 4,624,467 disclose foldable utility carts having hinged sidewalls which fold to lie flat against the floor of the cart. U.S. Pat. No. 5,080,387 discloses a collapsible utility carrier with hinged front and rear members which fold to lie flat against horizontal cross members. U.S. Pat. No. 4,669,743 discloses a collapsible cart whereby the floor hinges upward to fit between the vertically oriented sidewalls which are drawn together. Alternatively, U.S. Pat. No. 4,957,306 discloses a leaf carrying wagon whereby the floor and/or carrying bin of the cart hinges back upon itself for transport and storage. U.S. Pat. Nos. 4,635,956 and 4,826,202 disclose carts having a collapsible storage basket which is mounted on a frame. The basket side panels are hinged in the middle and fold inwards to achieve a folded container form. These latter carts, while collapsible in some respect, do not provide upper and lower working surfaces or shelves which would allow a user to conveniently load and stack items on two different levels.

Accordingly, what is needed in the field is a foldable or collapsible cart which provides multiple working shelves, with the uppermost shelf capable of being elevated to a working position. In the storage position, the upper shelf would thereby lie flat upon the lower shelf with an extendable connection between the two shelves. A conveniently-releasable locking mechanism should also be provided for controllable raising and lowering the upper shelf. The upper shelf, or a portion thereof, might also be removable in order to allow for top loading of larger items.

SUMMARY OF THE INVENTION

The present invention provides a foldable utility cart comprised of a lower support member, and an extendably-attached upper support member. Each lower and upper support member supports at least one loading tray, with an upper tray being removable. The upper support member includes a handle at a proximal end and the lower support member includes a pair of support feet on its corresponding proximal end and a pair of wheels on its opposite distal end.

A pair of pivoting cross braces with intersecting brace arms connects the upper and lower support members. The cross braces are pivotally attached at the proximal end of the support members and slidably engage the support members at their distal ends. In its elevated position, the upper support member is secured by the cross braces. In its lowered position, the upper support member rests proximately on top of the lower support member, with the cross brace members stacked horizontally between the support members.

A locking mechanism is included with a spring-loaded trigger located near the cart handle. A track is formed along each side of the upper support members, towards the distal end, for receiving a roller on each cross brace. The lower support members include corresponding slots for containing the free end of each cross brace. When the upper support member is raised, the trigger-side cross brace engages a spring-loaded catch arm, and the opposite, spring-side cross brace allows a biasing spring to return to an equilibrium position. As a result, the upper support member may be selectively locked into a spring-biased elevated position. Upon retraction of the trigger, the catch arm pivots and the cross brace member ends are free to slide distally in their respective tracks. As the cross braces pivot into a substantially-parallel relation with each other, the upper support member and associated shelves are lowered to a storage position. As the upper support member travels into this lowered position, the biasing spring is placed in tension; this tension results in damped downward motion of the upper support member.

The removable tray is supported by beams that form the sides of the upper support member. This shelf is removably placed between the beams and held in place by a retaining bar that spans the distal ends of the beams. The bar is pivotally connected to the spring-side beam and rotates over to engage the trigger-side beam, thereby forming a distal barrier against unwanted removal of the upper tray. By removing the upper tray, large objects, including trash bags, may be vertically loaded through the resulting opening.

In operation, the cart can be moved about by lifting the proximally located support feet off the ground and wheeling the cart. When the upper support member is lowered, the cart may also be tilted up to a vertical orientation, resting on the distal edges of the upper and lower support members for more convenient storage. The layout of the present cart makes it particularly useful for yard work and related household activities.

It is therefore an object of the present invention to provide a folding utility cart with an upper and lower working surface.

It is a related object of the present invention to provide a folding utility cart with an upper support member surface connected to a lower support member surface by extendable members.

It is another object of the present invention to provide a folding utility cart with wheels on the lower support member surface and a handle on the upper support member surface.

It is still another object of the present invention to provide a folding utility cart with extendable members comprised of pivotally-mounted cross braces.

It is yet another object of the present invention to provide a folding utility cart with tracks in the upper and slots in the lower support members for slidably receiving ends of the cross brace members to effectuate elevation of the upper support member.

It is still another object of the present invention to provide a folding utility cart with a spring element for biasing the cross brace members into an elevated position.

It is a further object of the present invention to provide a folding utility cart with a latch for locking the upper support member in position and a trigger lever for releasing the latch and allowing the upper support member to be lowered into a lowered position.

Still a further object at the present invention is to provide a folding utility cart with a removable upper tray that is held in position by a pivoting bar which spans the upper support member.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWING

FIG. 1 is a perspective view of the folding utility cart in its elevated position.

FIG. 2 is a perspective view of the folding utility cart in its elevated position with an upper shelf detachably removed and the retaining bar lowered.

FIG. 5 is a side cross-sectional view of the upper support member taken along line 5—5 of FIG. 2.

FIG. 6 is a side cross-sectional view of the upper support member taken along line 6—6 of FIG. 2.

DETAILED DESCRIPTION OF THE INVENTION

Figure 3:
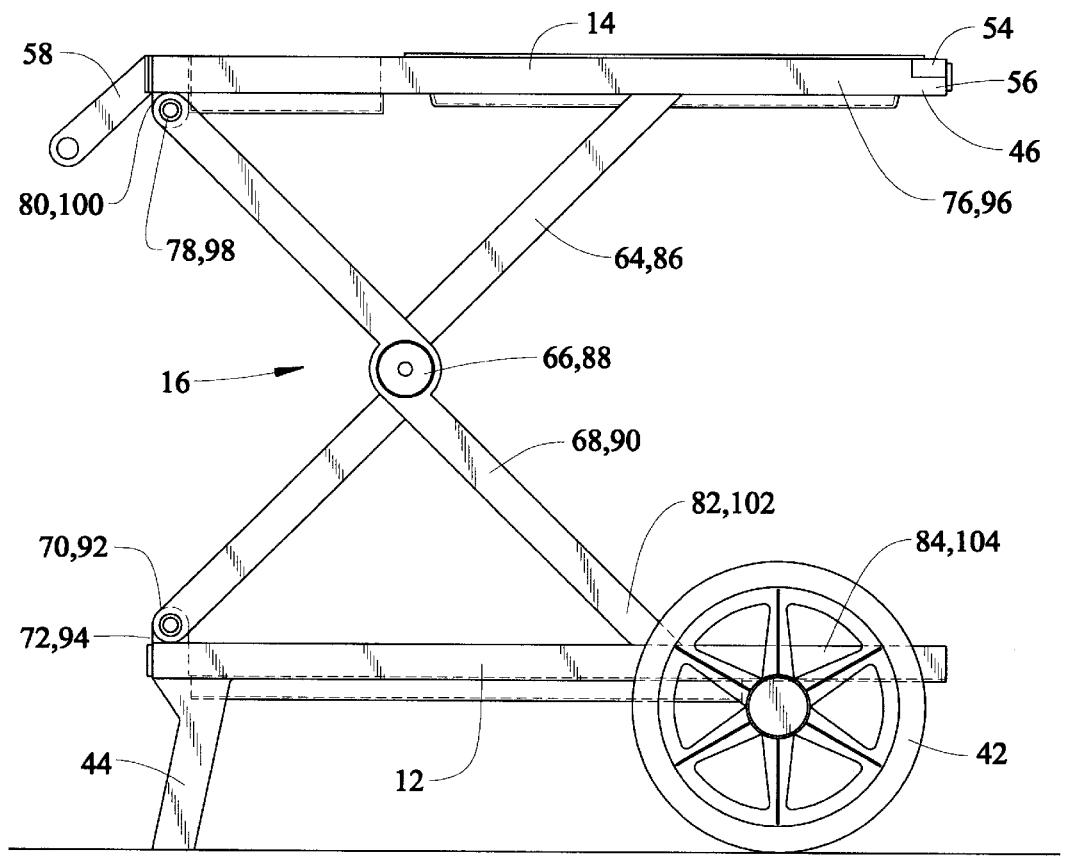
FIG. 3 is a side view of the folding utility cart in its elevated position.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Referring now to FIG. 1, a perspective view of the folding utility cart 10 is shown. The cart 10 comprises a lower support member 12, an upper support member 14, and a positioning means 16 that includes a trigger-side cross brace 18 and a spring-side cross brace 20, for positioning the upper support member 14 with respect to the lower support member 12. The cart 10 also includes a biasing means 22, for biasing the upper support member 14 into an elevated position, and a locking means 24 for locking the upper support member 14 into its elevated position.

With reference to FIGS. 1 and 2, the lower support member 12 is a substantially-rectangular frame defined by trigger-side beam 28 which is spaced apart from a spring-side beam 30 by a proximal cross bar 32 and a distal cross bar 34. The cross bars 32, 34 extend orthogonally between the beams 28,30. The region bounded by the trigger-side and spring-side beams 28,30 and the proximal and distal bars 32,34 contains a proximal shelf 36 and a distal shelf 38. The proximal shelf 36 occupies a horizontal plane which is lower than the horizontal plane of the distal shelf 38. The transition or seam between the proximal and distal shelves 36,38 is characterized by a vertical stop edge 40. A pair of wheels 42 is attached, one wheel each, to the trigger-side beam 28 and the spring-side beam 30. A pair of vertical support feet 44 extend downward from the proximal cross bar 32. The cart 10 may be wheeled from one place to another on the wheels 42. The included support feet 44 allow the cart 10 to easily be left unattended, with the upper and lower support members 14,12 providing level surfaces to support items placed thereon.

Similar to the lower support member 12, the upper support member 14 is also a substantially-rectangular frame defined by a trigger-side beam 46 spaced apart from a spring-side beam 48 by a proximal cross bar 50 and a middle cross bar 52. The cross bars 50,52 extend orthogonally between the beams 46,48. A spring-side end of the retaining bar 54 is pivotally attached to the distal end of the spring-side beam 46. The trigger-side end of the retaining bar 54 is sized to engage a notch 56 cut out of the distal end of the trigger side beam 46. A three-sided handle 58 extends orthogonally from the proximal cross bar 50 and facilitates movement of the cart 10. The upper support member 14 further includes a fixed tray 60 and a removable tray 62. Both trays 60,62 extend between the spring-side beam 48 and the trigger-side beam 46. The trays 60,62 are separated by the middle cross bar 52. The fixed tray 60 abuts the proximal cross bar 50; the removable tray 62 abuts the retaining bar 54. Three holes are cut into the fixed tray to hold tools or allow drainage. The number of holes may be changed according to the intended use of the cart 10.

Referring still to FIG. 2, the folding utility cart 10 is shown with the removable tray 62 detached from the upper support member 14. The retaining bar 54 is shown swung over to its neutral and unengaged position. In order to reinstall the tray 62, the bar 54 is swung clockwise, as indicated by arrow 63, to engage notch 56 on the upper support member trigger-side beam 46. The tray 62 is placed in the square compartment thereby formed by the upper support member 14 and retaining bar 54. When engaging the notch 56, the retaining bar 54 forms a barrier against movement of the tray 62.

With continued reference to FIG. 2 and with additional reference to FIGS. 3 and 5, the positioning means 16 includes a trigger-side cross brace 18 and a spring-side cross brace 20. The trigger-side brace 18 is defined by a first arm 64, the middle of which is attached by a pin 66 to the middle of a second arm 68. A pinned end 70 of the first arm 64 is pinned to an attachment flange 72 that extends upward from the corner formed by the lower support member proximal cross bar 32 and trigger-side beam 28. As shown in FIG. 5, a free end of the first arm 64 includes a roller 74 that is sized to roll within a track 76 disposed within the upper support member trigger-side beam 46. Referring again to FIGS. 2 and 3, a pinned end 78 of the trigger-side cross brace second arm 68 is pinned to an attachment flange 80 extending downward from the corner by the trigger-side beam 46 and the upper support member proximal cross bar 50. A free end 82 slides within a slot 84 that is formed within the lower support member trigger-side beam 28. The slot 84 extends between the distal cross bar 34 and the vertical stop edge 40.

Figure 4:
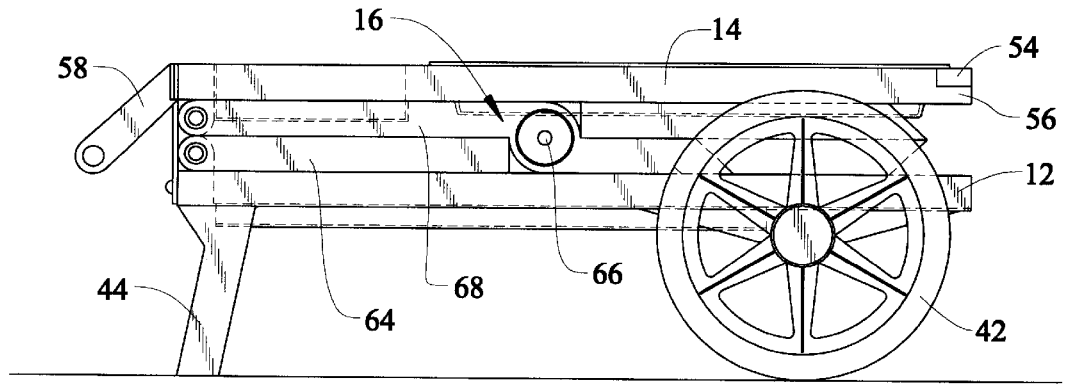
FIG. 4 is a side view of the folding utility cart in its lowered position.

The spring-side cross brace 20 forms a mirror image of the trigger-side cross brace 18. Accordingly, the spring-side brace 20 is defined by a first arm 86, the middle of which is attached by a pin 88 to the middle of a second arm 90. A pinned end 92 of the first arm 86 is pinned to an attachment flange 94 that extends upward from the corner formed by the lower support member proximal cross bar 32 and spring-side beam 30. As shown in FIG. 5, a free end of the first arm 86 includes a roller 74 that is sized to roll within a track 96 disposed within the upper support member spring-side beam 48. Referring again to FIGS. 2 and 3, a pinned end 98 of the spring-side cross brace second arm 90 is pinned to an attachment flange 100 extending downward from the corner by the spring-side beam 48 and the upper support member proximal cross bar 50. A free end 102 slides within a slot 104 that is disposed within the lower support member spring-side beam 30. The slot 104 extends between the distal cross bar 34 and the vertical stop edge 40. As shown in FIG. 4, the trigger-side cross brace arms 64,68 and the spring-side cross brace arms 86,90 are shaped to lie flat when the upper support member 14 is in a lowered position.

During movement of the upper support member 14, the trigger-side and spring-side cross braces 18, 20 undergo a scissoring action which supports the upper support member 14 and keep it substantially-horizontal. When the upper support member 14 is biased into an elevated position, the vertical stop edge 40, which extends across the slots 84,104, engages and secures the bottom free ends 82, 102 of each cross brace 18,20.

Now referring again to FIG. 5, the biasing means 22 includes a biasing spring 106 having a first hook 108 attached to an attachment post 110, at one end, and a second hook 112 attached to a spring attachment bracket 114 at an opposite end. The spring attachment bracket 114 is, in turn, fastened to the spring-side cross brace first arm 86, near roller 74.

With reference to FIG. 6, the locking means 24 includes a link arm 116 which is pinned at a link arm pinned end 118 to the upper support member trigger-side beam 46. The link arm 116 pivots about pivot pin 120 and is attached to catch arm 122 via a link pin 124 that extends into a slotted end 126 of the catch arm 122. The catch arm 122 is pivotally attached to upper support member trigger-side beam 46 at a pivot mount 128. The catch arm has a hooked end 130 which is shaped to engage a locking post 132 that extends orthogonally from the trigger-side cross brace first arm 64, near roller 74. The hooked end 130 is forced against the locking post 132 by a retention spring 134, which is in tension. The retention spring 134 has, at one end, a first hook 136 which is attached to an attachment post 138 on the link arm 116. At the opposite end, the retention spring 134 has a second hook 140 which is attached to the upper support member cross bar 52.

Still referring to FIG. 6, the release means 26 includes a trigger pull rod that has an attachment end 144 attached to attachment post 138. Opposite the attachment end 144, the trigger pull rod 142 has a bent end 146 that is supported by a trigger support bracket 148 extending from the upper support member proximal cross bar 50. By pulling the bent end 146 of the trigger pull rod 142, the force in the retention spring 134 may be overcome, pivoting the catch arm hooked end 130 away from the locking post 132. This pivoting unlocks the upper support member 12 from its elevated position and allows it to be lowered. As the upper support member 12 is lowered, the biasing spring 106 is placed into tension. The resulting tension in the biasing spring 106 produces a controlled lowering motion within in the upper support member 12 and cross braces 18,20. After the upper support member is lowered, the cart 10 may be tipped into a vertical orientation. The distal cross bar and retaining bar 34,54 of the lower and upper support members 12,14 can be used to support the cart 10 in this vertical orientation.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A foldable utility cart comprising:

an upper support member comprising a substantially-rectangular frame defined by a first beam spaced apart from a second beam by a plurality of cross bars; a first track disposed within said first beam and sized to accept an end of a first cross brace support; and a second track disposed within said second beam and sized to accept an end of a second cross brace support;

a lower support member comprising a substantially-rectangular frame defined by a first beam spaced apart from a second beam by a plurality of cross bars; a first slot disposed within said first beam and sized to receive an end of a first cross brace support; and a second slot disposed within said second beam and sized to accept an end of a second cross brace support;

a positioning means for adjustably positioning said upper support member in an elevated position above said lower support member, said positioning means including a first cross brace support having a first arm pivotally attached to a second arm; said first arm having a pinned end pinned to said lower support member, and a free end disposed within said first track; said first arm free end having a roller sized to operatively communicate with said first track; said first arm free end having a locking post extending orthogonally therefrom; said second arm having a pinned end pinned to said upper support member, and a free end disposed within said first slot; a second cross brace support having a first arm pivotally attached to a second arm; said first arm having a pinned end pinned to said lower support member, and a free end disposed within said second track; said first arm free end having a roller sized to operatively communicate with said second track; said first arm free end including a spring attachment bracket; said second arm having a pinned end pinned to said upper support member, and a free end disposed within said second slot, each of said cross brace supports extending between said upper and lower support members;

biasing means for helping raise said upper support into an elevated position;

locking means for securing said upper support member in said elevated position; and release means for unlocking said upper support means from said elevated position.

2. The foldable utility cart of claim 1, wherein said biasing means includes a spring having a predetermined spring constant; said spring extending between said spring attachment bracket and said upper support member.

3. The foldable utility cart of claim 1, wherein said locking means includes a link arm pivotally-attached to a catch arm; said catch arm pivotally-attached to one of said upper support member beams and having a hooked end sized to engage said locking post; a retention spring extending between said upper support member and said link arm, said retention spring sized to position said hooked end against said locking post.

4. The foldable utility cart of claim 1, wherein said release means said larger pull rod attached to a link arm, said link arm being pivotally attached to said upper support member.

5. A foldable utility cart comprising:

an upper support member;

a lower support member;

a positioning means for adjustably positioning said upper support member in an elevated position above said lower support member, said positioning means including a first cross brace support and a second cross brace support, each of said cross brace supports extending between said upper and lower support members;

said upper support member being a substantially-rectangular frame defined by a first beam spaced apart from a second beam by a plurality of cross bars;

said upper support member further including at least one removable tray disposed between said first and second beams; at least one handle extending from at least one of said cross bars; a retaining bar pivotally attached to one of said beams; a first track disposed within said first beam and sized to accept an end of said first cross brace support; a second track disposed within said second beam and sized to accept an end of said second cross brace support;

said lower support member being a substantially-rectangular frame defined by a first beam spaced apart from a second beam by a plurality of cross bars;

said lower support member further including a first shelf and a second shelf each extending between said first and second beams, said first and second shelves being separated by a stop edge extending between said first and second beams; at least one wheel rotatably attached to at least one of said beams; at least one support foot attached to at least one of said cross bars; a first slot disposed within said first beam and sized to receive an end of said first cross brace support; a second slot disposed within said second beam and sized to accept an end of said second cross brace support;

said first cross brace support having a first arm pivotally attached to a second arm; said first arm having a pinned end pinned to said lower support member; said first arm having a free end disposed within said first track, said free end having a roller sized to operatively communicate with said first track; said second arm having a pinned end pinned to said upper support member; said second arm having a free end disposed within said first slot; said first arm free end having a locking post extending orthogonally therefrom;

said second cross brace support having a first arm pivotally-attached to a second arm; said first arm having a pinned end pinned to said lower support member; said first arm having a free end disposed within said second track, said free end having a roller sized to operatively communicate with said second track; said second arm having a pinned end pinned to said upper support member; said second arm having a free end disposed within said second slot; said first arm free end including a spring attachment bracket;

biasing means for helping raise said upper support into an elevated position;

said biasing means including a spring having a predetermined spring constant; said spring extending between said spring attachment bracket and said upper support member;

locking means for securing said upper support member in said elevated position;

said locking means including a link arm pivotally-attached to a catch arm; said catch arm pivotally-attached to one of said upper support member beams and having a hooked end sized to engage said locking post; a retention spring extending between said upper support member and said link arm, said retention spring sized to position said hooked end against said locking post;

release means for unlocking said upper support means from said elevated position;

said release means including a trigger pull rod attached to said link arm, said link arm being pivotally attached to said upper support member.

* * * * *